(12) United States Patent
Okamoto et al.

(10) Patent No.: US 11,526,148 B2
(45) Date of Patent: Dec. 13, 2022

(54) CONTROL APPARATUS FOR INDUSTRIAL MACHINE, CONTROL SYSTEM FOR INDUSTRIAL MACHINE, AND METHOD FOR CONTROLLING INDUSTRIAL MACHINE

(71) Applicant: KABUSHIKI KAISHA YASKAWA DENKI, Kitakyushu (JP)

(72) Inventors: Hiroshi Okamoto, Kitakyushu (JP); Takeshi Nagata, Kitakyushu (JP); Ayaka Hashimoto, Kitakyushu (JP); Yu Katono, Kitakyushu (JP); Naohide Sakimura, Kitakyushu (JP); Masaomi Kudo, Kitakyushu (JP); Takaaki Shogaki, Kitakyushu (JP); Megumi Yasuda, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 90 days.

(21) Appl. No.: 16/660,043

(22) Filed: Oct. 22, 2019

(65) Prior Publication Data
US 2020/0125065 A1      Apr. 23, 2020

(30) Foreign Application Priority Data

Oct. 23, 2018 (JP) .............................. JP2018-199068

(51) Int. Cl.
*G05B 19/409* (2006.01)
(52) U.S. Cl.
CPC .. *G05B 19/409* (2013.01); *G05B 2219/32128* (2013.01)

(58) Field of Classification Search
CPC ........ G05B 19/409; G05B 2219/32128; G05B 19/056; G05B 19/05; G05B 15/02; G05B 19/418; G05B 2219/2642; G06F 9/4881
See application file for complete search history.

(56) References Cited

U.S. PATENT DOCUMENTS

| 5,761,520 A | 6/1998 | Mase et al. |
| 2014/0005835 A1 | 1/2014 | Nishiyama et al. |
| 2014/0012402 A1 | 1/2014 | Nishiyama et al. |

(Continued)

FOREIGN PATENT DOCUMENTS

| JP | 8-212112 A | 8/1996 |
| JP | 2010-134888 A | 6/2010 |

(Continued)

OTHER PUBLICATIONS

Japanese Office Action dated Jan. 21, 2020, in Patent Application No. 2018-199068, 6 pages (with unedited computer generated English translation).

(Continued)

*Primary Examiner* — Mohammad Ali
*Assistant Examiner* — Sheela Rao
(74) *Attorney, Agent, or Firm* — Oblon, McClelland, Maier & Neustadt, L.L.P.

(57) ABSTRACT

A control apparatus for performing control processing and user period processing within a control period for an industrial machine includes processing circuitry that sets content of the control processing, and sets an upper limit of the user period processing. The user period processing is different from the control processing.

15 Claims, 7 Drawing Sheets

(56) References Cited

U.S. PATENT DOCUMENTS

| | | | |
|---|---|---|---|
| 2014/0358271 A1* | 12/2014 | Asakawa | G05B 19/41865 700/112 |
| 2017/0068234 A1 | 3/2017 | Yaoita et al. | |
| 2018/0143606 A1* | 5/2018 | Kawanoue | G05B 19/05 |
| 2019/0129386 A1* | 5/2019 | Sato | G05B 19/4065 |

FOREIGN PATENT DOCUMENTS

| | | |
|---|---|---|
| JP | 2012-194662 A | 10/2012 |
| JP | 2016-26878 A | 2/2016 |
| JP | 2017-227961 A | 12/2017 |

OTHER PUBLICATIONS

European Office Action dated Apr. 30, 2021 in European Patent Application No. 19203779.4, 4 pages.
Extended European Search Report dated Feb. 12, 2020 in European Patent Application No. 19203779.4, 9 pages.
Combined Chinese Office Action and Search Report dated Jan. 14, 2020 in Chinese Patent Application No. 201810105148.X, 15 pages (with English translation).
Notice of Reasons for Refusal dated Jun. 2, 2020 in Japanese Patent Application No. 2018-199068 (with English language machine translation), 6 pages.
European Office Action issued Jul. 6, 2022 in European Patent Application No. 19203779.4 dated Oct. 17, 2019 therein, 6 pages.

* cited by examiner

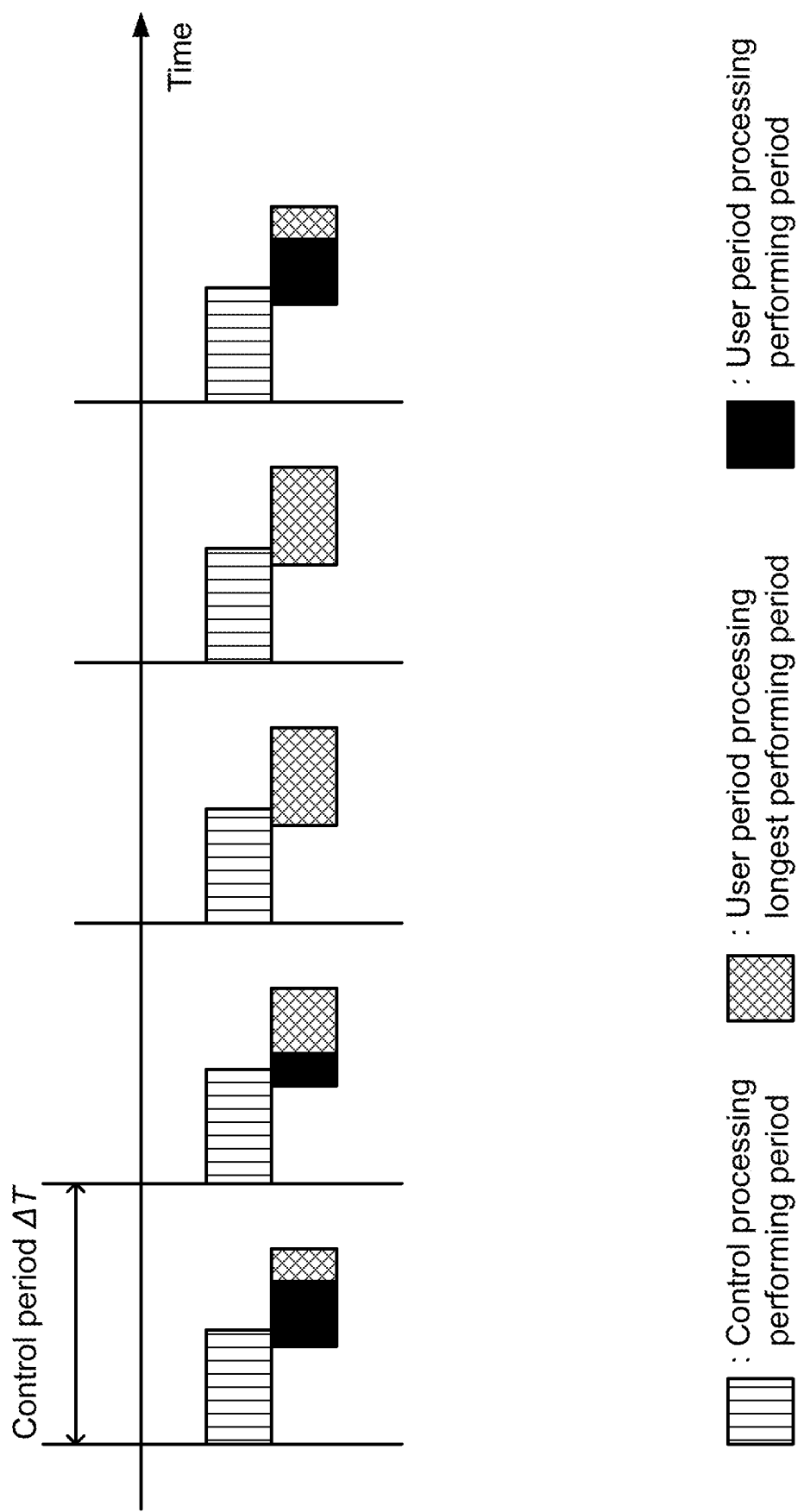

CONTROL APPARATUS FOR INDUSTRIAL MACHINE, CONTROL SYSTEM FOR INDUSTRIAL MACHINE, AND METHOD FOR CONTROLLING INDUSTRIAL MACHINE

CROSS-REFERENCE TO RELATED APPLICATIONS

The present application claims priority under 35 U.S.C. § 119 to Japanese Patent Application No. 2018-199068, filed Oct. 23, 2018. The contents of this application are incorporated herein by reference in their entirety.

BACKGROUND

Field of the Invention

The embodiments disclosed herein relate to a control apparatus for an industrial machine, a control system for an industrial machine, and a method for controlling an industrial machine.

Discussion of the Background

JP 2010-134888A discloses a configuration associated with equipment operation monitoring. The configuration obtains a history of equipment operations such as stopping.

SUMMARY

According to one aspect of the present invention, a control apparatus for performing control processing and user period processing within a control period for an industrial machine includes processing circuitry that sets content of the control processing, and sets an upper limit of the user period processing. The user period processing is different from the control processing.

According to another aspect of the present invention includes a control system includes an industrial machine, and a control apparatus for performing control processing and user period processing within a control period for the industrial machine. The control apparatus includes processing circuitry that sets content of the control processing, and sets an upper limit of the user period processing, and the user period processing is different from the control processing.

According to yet another aspect of the present disclosure, a method for controlling an industrial machine in a control system includes setting content of control processing using processing circuitry of a control apparatus, and setting an upper limit of user period processing using the processing circuitry of the control apparatus. The control system includes the control apparatus for performing the control processing and the user period processing within a control period for the industrial machine. The control apparatus includes the processing circuitry that sets content of the control processing, and sets the upper limit of the user period processing, and the user period processing is different from the control processing.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 7 schematically illustrates the period processing in a case where the controller includes a multi-core CPU.

DESCRIPTION OF THE EMBODIMENTS

Figure 1:
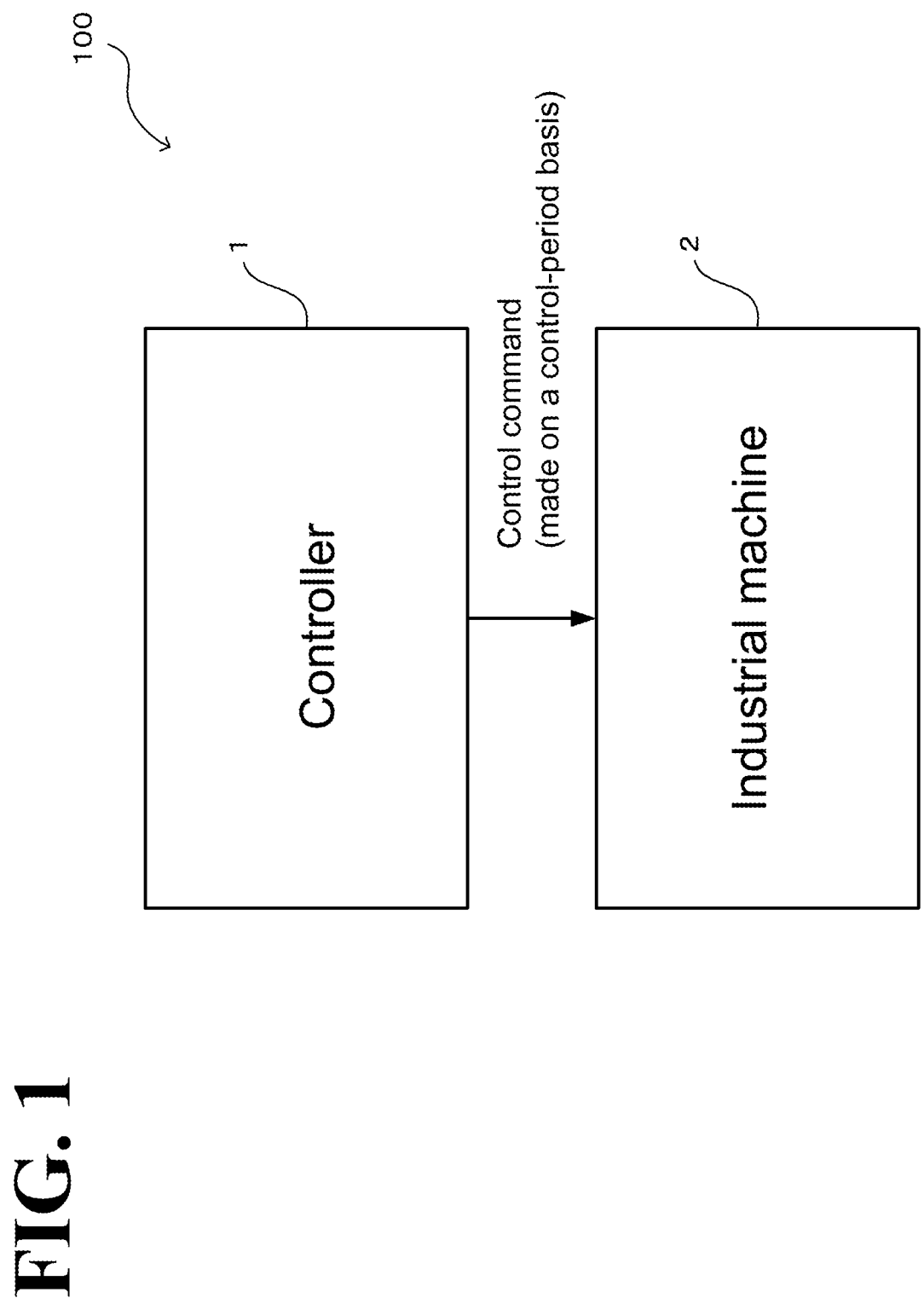
FIG. 1 illustrates a schematic block configuration of a control system according to an embodiment for an industrial machine.

The embodiments will now be described with reference to the accompanying drawings, wherein like reference numerals designate corresponding or identical elements throughout the various drawings.

General Arrangement of Control System for Industrial Machine

By referring to FIG. 1, an example general arrangement of a control system according to this embodiment for an industrial machine will be described.

FIG. 1 is a schematic block configuration of a control system for an industrial machine. It is to be noted that the control system according to this embodiment will be denoted as an industrial machine control system that controls the operation of an industrial machine. As illustrated in FIG. 1, an industrial machine control system 100 includes a controller 1 and an industrial machine 2.

The controller 1 (which is a non-limiting example of the control apparatus recited in the appended claims) is a computer that includes unillustrated elements including central processing unit (CPU) and a memory such as read-only memory (ROM) and random access memory (RAM). At an upper-level control command from an operation server 4 (described later), the controller 1 serves a motion control function of controlling the industrial machine 2 to make a desired motion that is changeable over time. Specifically, the motion control function includes a control processing of outputting a control command on a predetermined-control-period basis. The control command is for causing, in a real-time, highly accurate manner, a motor, an air cylinder, or another actuator (not illustrated) that serves as a motive power source of the industrial machine 2 to make a desired motion (see FIG. 4, described later). While in this embodiment the CPU of the controller 1 is a "single-core" processor (which includes a single processing unit), the CPU of the controller 1 may be a "multi-core" processor.

The industrial machine 2 is a machine system controlled by the industrial machine control system 100. In this embodiment, the industrial machine 2 is operated by a user (product manufacturer), described later, to produce a predetermined product from a predetermined material or workpiece (see FIG. 5, described later). The internal configuration of the industrial machine 2 is, in large part, made up of mechanisms each equipped with an actuator such as a motor and an air cylinder, not illustrated, so that each mechanism is controlled by torque and/or thrust input from the actuator.

A system configuration of the industrial machine control system 100 according to this embodiment will be described.

To the industrial machine control system 100, two user-interface terminals, an engineering tool 3 and the operation server 4, are connectable. The engineering tool 3 and the operation server 4 are used by different operators. Specifically, the controller 1 are used by two kinds of operators. One kind of operator is an industrial machine manufacturer, who has produced the industrial machine control system 100 as a whole using the controller 1. The industrial machine manufacturer operates the engineering tool 3. The other kind of operator is a product manufacturer, who produces a product by operating the industrial machine control system 100. The product manufacturer is regarded as a user and operates the operation server 4.

Figure 2:
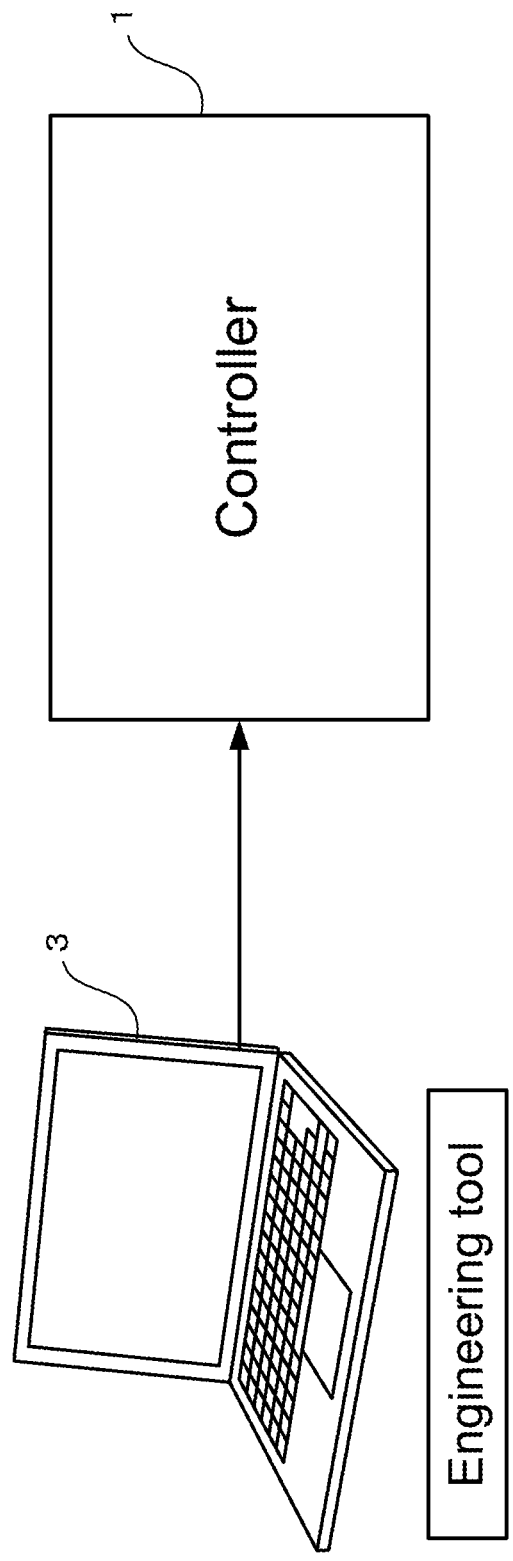
FIG. 2 illustrates how information is sent and received between a controller and an engineering tool.

As illustrated in FIG. 2, the engineering tool 3 (which is a non-limiting example of the first input device recited in the appended claims) is a terminal that is brought into connection with the controller 1 at such times as production of the industrial machine control system 100, adjustment of the industrial machine control system 100 before a practical operation, and repair of the industrial machine control system 100. That is, the engineering tool 3 is used by the industrial machine manufacturer, instead of by the user.

In the embodiment illustrated in FIG. 2, the engineering tool 3 is a general-purpose personal computer (laptop PC) that includes CPU (not illustrated), memory (such as ROM and RAM, not illustrated), display section, and operation section. In another possible embodiment, the engineering tool 3 may be a dedicated operation terminal. The engineering tool 3 has a function of outputting various kinds of setting commands to the controller 1 to instruct control details in each step of production or operation of the industrial machine 2; and a function of receiving and displaying various kinds of state information of the inside of the controller 1 as of the point of time of each step.

Figure 3:
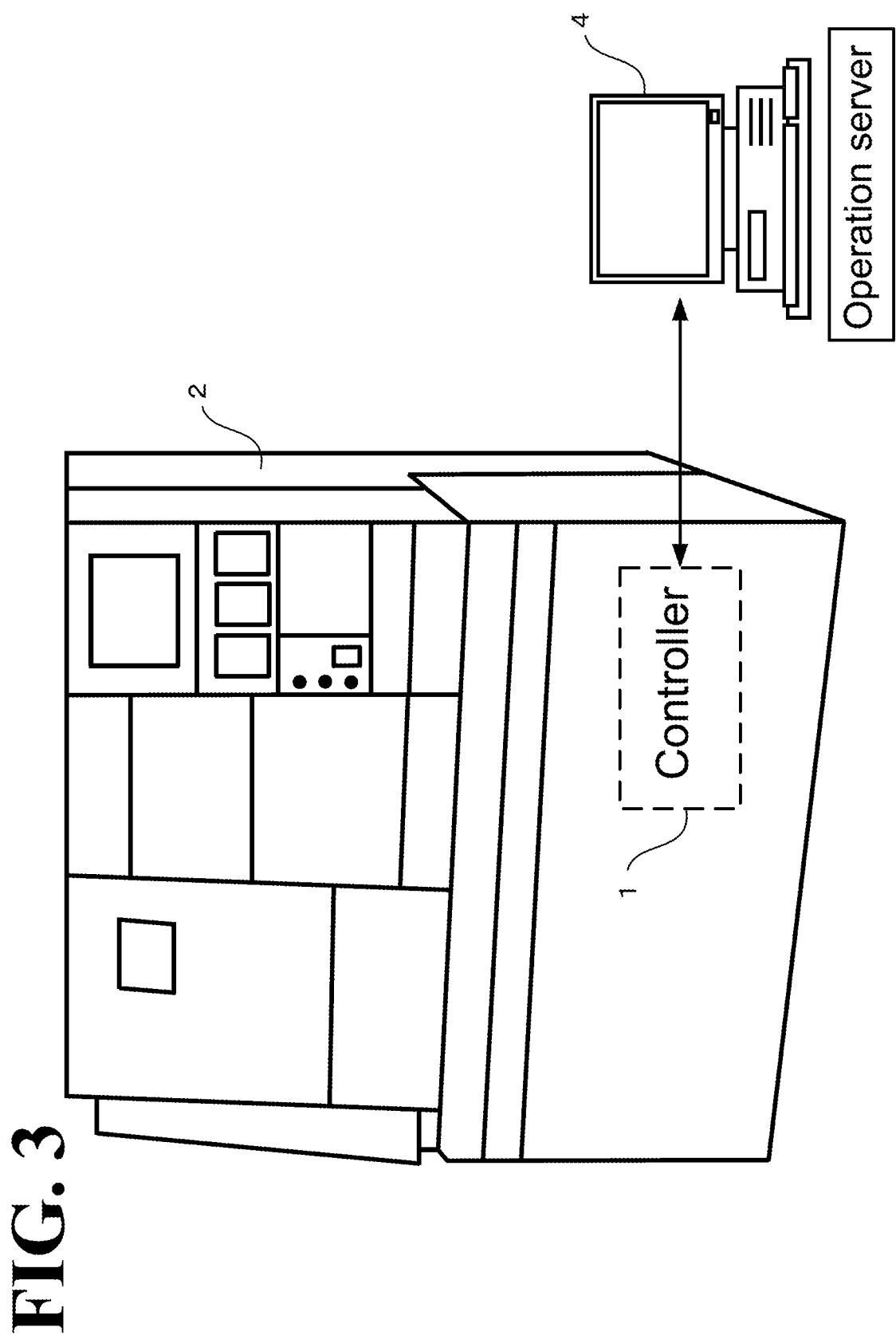
FIG. 3 illustrates how information is sent and received between the controller and an operation server.

As illustrated in FIG. 3, the operation server 4 (which is a non-limiting example of the second input device recited in the appended claims) is, basically, a terminal that is continually connected to the controller 1 and used by the user when the user produces a product by operating the industrial machine control system 100. It is to be noted, however, that the engineering tool 3 may occasionally be connected to the controller 1 when, for example, the industrial machine manufacturer needs to adjust or repair the industrial machine control system 100. In the embodiment illustrated in FIG. 3, the industrial machine 2 is a machining center. It is to be noted that the second input device may not necessarily take the form of the operation server 4 but may be some other engineering tool that can be brought into connection with the controller 1 when the user makes settings in the controller 1. Thus, the second input device may not necessarily be an engineering tool continually connected to the controller 1.

In the embodiment illustrated in FIG. 3, the operation server 4 is a general-purpose personal computer that includes CPU (not illustrated), memory (such as ROM and RAM, not illustrated), display section, and operation section. The operation server 4 has a function of displaying an operation state of the industrial machine 2; and a function of outputting a control command to the controller 1 based on the operation state of the industrial machine 2. It is to be noted that while the industrial machine control system 100 is in operation, the engineering tool 3 may be removed from the entire system (see FIG. 5, described later).

Features of this Embodiment

Many typical factory automation systems, including the industrial machine control system 100, are equipped with a control apparatus (such as the controller 1) to control an industrial machine (such as the industrial machine 2). In order to provide a high level of real-time performance, the control apparatus (such as the controller 1) performs control on a predetermined-control-period basis.

It is an industrial machine manufacturer that produces the industrial machine control system 100 using the controller 1, and it is a user that purchases and uses the industrial machine control system 100. Generally, the industrial machine manufacturer and the user are different from each other. In recent years, however, there has been a need that the operation of the industrial machine control system 100 is managed and optimized on the part of the user. Specifically, it has been desired that a user himself or herself is able to: add a period processing that is high in level of real-time performance enough to be synchronized with the period of the above-described control (this period processing will be hereinafter referred to as user period processing); and perform various kinds of setting associated with the user period processing.

This requires the user to have access to specifications information of the controller 1 associated with control processings. However, such information is only accessible by the industrial machine manufacturer, who has designed the machine configuration and drive control of the industrial machine 2. If the user without the information adds a user period processing and performs associated settings, it is highly possible that the industrial machine control system 100 itself can not be operated.

Specifically, when a control processing is performed within one period length (time length) of a control period and when another user period processing is additionally performed, the control processing is performed first and the user period processing is performed next. If the period of time for which the user period processing is performed exceeds the one period length, an error processing is performed, with the result that the control operation is stopped. In order to add another user period processing while avoiding an excess of the one period length, the user needs access to the specifications information to obtain knowledge of, for example, the one period length and/or the longest period of time necessary for performing a control processing, so that the user makes a setting based on the information. It has been difficult for the user to obtain the specifications information and add and set a user period processing based on the specifications information.

In light of the circumstances, the controller 1 according to this embodiment includes a control processing setting section and a user period processing upper-limit setting section. The control processing setting section sets content of a control processing. The user period processing upper-limit setting section sets an upper limit of a user period processing that is different from the control processing, which is performed on a control-period basis.

This enables the user to readily add and set a desired user period processing without having to consider control-related restrictions on the part of the industrial machine 2 (for example, the amount of processing stably performed within one control period). Detailed description will be made below with regard to how to set a user period processing.

Period Processing Performed by Controller

Figure 4:
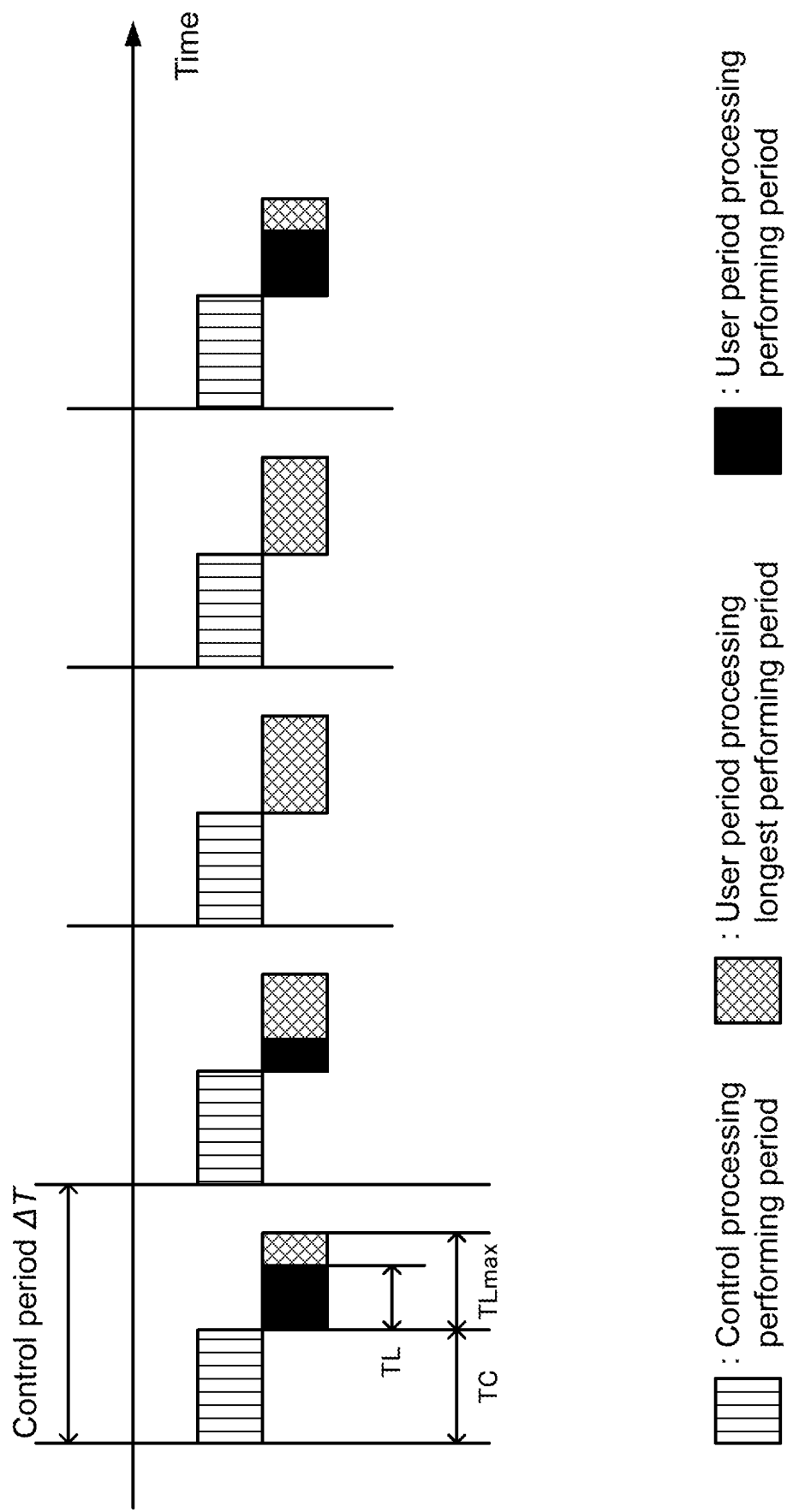
FIG. 4 schematically illustrates a period processing performed by the controller.

FIG. 4 schematically illustrates a period processing (synchronization task) repeated on a control-period basis in the controller 1. As illustrated in FIG. 4, control periodic lengths ΔT each of a predetermined period of time are aligned with each other. Within one periodic length ΔT, the controller 1 first performs a control processing of generating a control command using a program such as a ladder program (see the solid horizontal stripe portion in FIG. 4). When a user period processing is added afterwards, the user period processing is performed after the control processing has been performed. A non-limiting example of the user period processing to be added is data logging processing, which is such a processing that the controller 1 obtains, synchronously with a control period, various kinds of control data and/or control parameters from the inside of the controller 1 itself or an external device such as the industrial machine 2, and stores the obtained control data and/or control parameters.

The control processing and the user period processing are two period processings repeated on a control-period basis. If the period of time for which the two period processings are performed exceeds the one periodic length ΔT, the controller 1 itself performs an error processing, stopping the control operation. In light of this, it is necessary to keep the period of time for which the two period processings are performed within the one periodic length ΔT.

Assume that the period, TC, of time for which the control processing is performed in each control period is approximately constant while the period, TL, of time for which the user period processing is performed in each control period (see the blacked-out portion in FIG. 4) is variable. In this case, a possible manner of performing the user period processing to avoid an error processing is to set a predetermined suitable upper limit on the period TL of time for which the user period processing is performed (see the hatched portion in FIG. 4), and to perform the user period processing within the upper limit. Specifically, the period TC of time for which the control processing is performed (which is approximately constant) is subtracted from the one periodic length ΔT, obtaining a time difference. A longest allowable period $TL_{max}$ of time for which the user period processing is performed is set and fixed at or below the time difference (that is, $TL_{max} \leq \Delta T - TC$).

Assignment of Settings Associated with Period Processing

When there is a need for adding and setting a user period processing, which is different from a control processing, it is a user, who operates the industrial machine control system 100, that makes a command for adding and setting a user period processing to the controller 1. In this respect, the one periodic length ΔT of a control period, the period TC of time for which the control processing is performed, and the period TL of time for which the user period processing is performed are specifications information only accessible by the industrial machine manufacturer, who has designed the machine configuration and drive control of the industrial machine 2. If the user without the information adds a user period processing and performs associated settings, it is highly possible that the controller 1 itself turns into error mode, with the result that the industrial machine control system 100 can not be operated. In light of the circumstances, in this embodiment, the settings associated with the period processing of the controller 1 are assigned to the industrial machine manufacturer and the user, as illustrated in FIG. 5.

Figure 5:
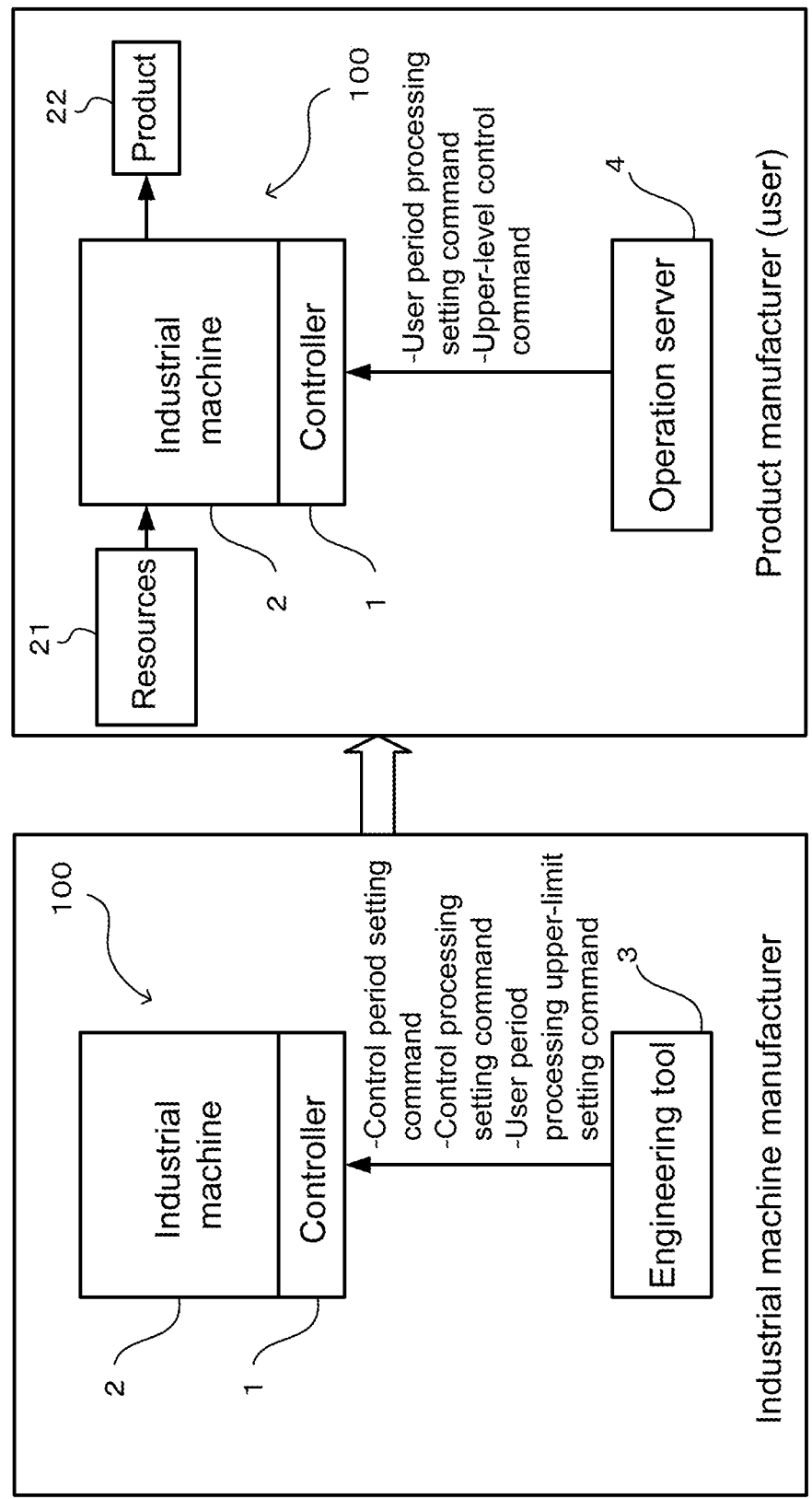
FIG. 5 illustrates a process for performing settings associated with the period processing performed by the controller such that the settings are performed on the part of an industrial machine manufacturer and on the part of a user.

Specifically, as illustrated in FIG. 5, the industrial machine manufacturer first produces the industrial machine control system 100 by combining the controller 1 with the industrial machine 2. It is assumed that the controller 1 has a function of performing various period processings applicable as a control processing and a user period processing. Then, at the time of factory-shipping or on-site adjustment of the industrial machine control system 100, the industrial machine manufacturer uses the engineering tool 3, which can only be used by the industrial machine manufacturer, to input setting commands necessary for the period processings of the controller 1. Specifically, the setting commands include: a control period setting command, which is for setting the periodic length ΔT of a control period; a control processing setting command, which is for setting content of the control processing (such as a ladder program); and a user period processing upper-limit setting command, which is for setting the longest allowable period $TL_{max} \leq$. By this setting operation performed by the industrial machine manufacturer, the longest allowable period $TL_{max}$ (which is the upper limit of the user period processing performed by the controller 1) is set appropriately with specifications information of the industrial machine control system 100 taken into consideration so that the controller 1 is prevented from turning into error mode.

Then, the user performs an input operation through the operation server 4 to operate the industrial machine control system 100. Specifically, the user supplies resources 21 (including materials and parts) to the industrial machine 2, thereby producing a final product 22. During this operation, a user period processing (for example, data logging processing) may be added. Specifically, before the operation, the user inputs a user period processing setting command into the controller 1 through the operation server 4 so as to set content of a desired user period processing. In setting content of a desired user period processing, the controller 1 puts restrictions on the setting of the processing content based on the longest allowable period $TL_{max}$, which is set in advance by the industrial machine manufacturer. This eliminates or minimizes occurrence of an error while period control is being performed.

When, for example, the user period processing to be added is a data logging processing, the period TL of time for which the user period processing is performed in each control period is generally dependent on the kind of data obtained and/or the number of data obtained. In light of this, it is possible for the controller 1 or the operation server 4 to perform a notification processing when the content of the logging processing (the kind of data obtained and/or the number of data obtained) that the user is setting is in excess of the longest allowable period $TL_{max}$. Alternatively, it is possible to prepare in advance a model of a setting file that automatically limits the kind and/or number of logging data so that the period TL is kept within the longest allowable period $TL_{max}$. This enables the user to know the longest allowable period $TL_{max}$ in an indirect manner, that is, in a form converted into the kind and/or number of data Processing Block Configuration Inside of Controller.

Figure 6:
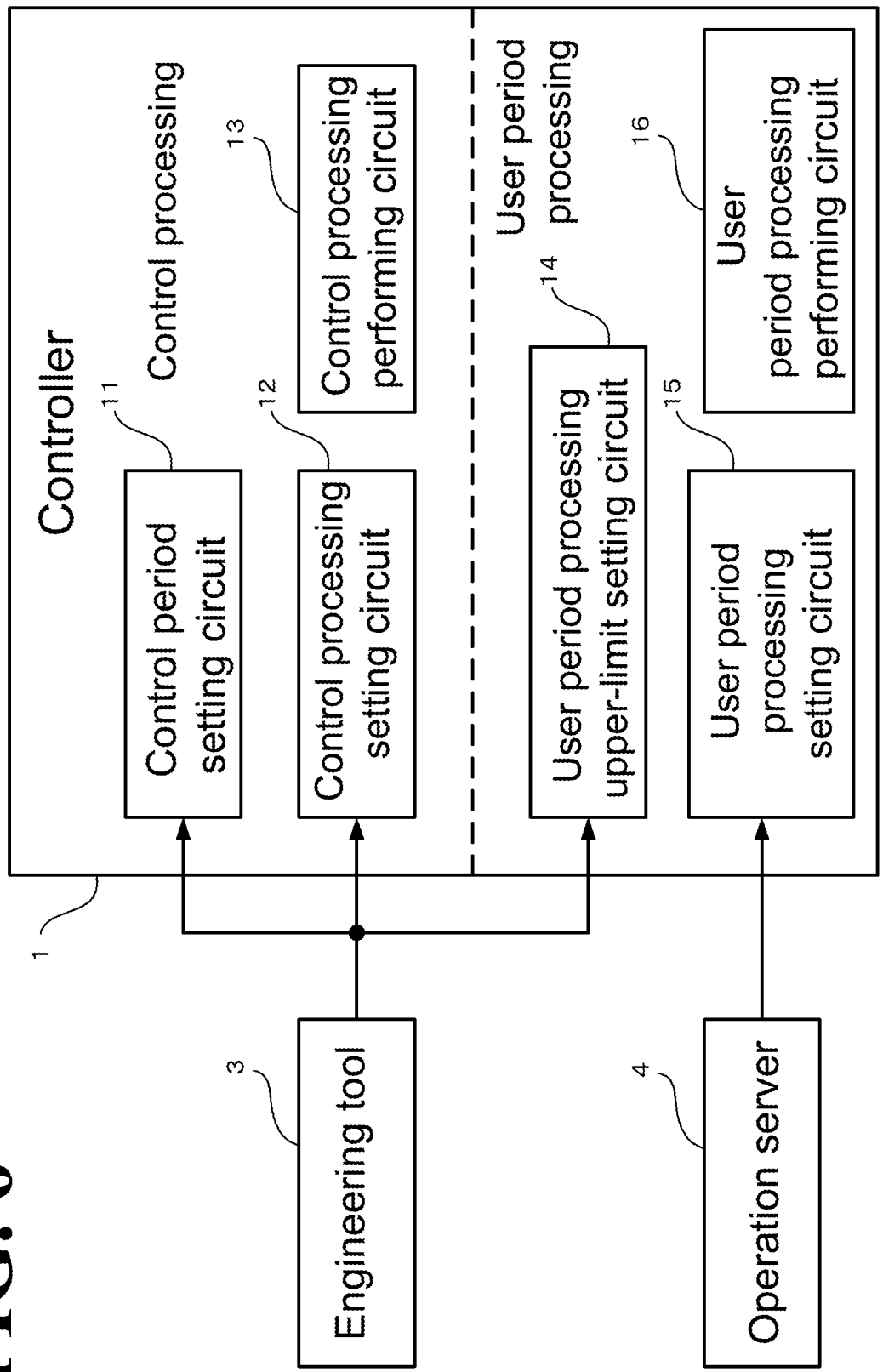
FIG. 6 is a diagram illustrating a configuration of processing blocks mounted on the controller.

FIG. 6 illustrates a processing block configuration of the controller 1 for the above-described period processing settings. Referring to FIG. 6, the controller 1 includes a control period setting section 11, a control processing setting section 12, a control processing performing section 13, a user period processing upper-limit setting section 14, a user period processing setting section 15, a user period processing performing section 16. Each of these processing blocks of the controller 1 is implemented in the form of a software block performed by the CPU of the controller 1 (which is a non-limiting example of the calculation section of the control apparatus recited in the appended claims). It is to be noted that each of these processing blocks of the controller 1 may be implemented by a hardware circuit or a combination of hardware circuits.

The control period setting section 11 has a function of setting the periodic length ΔT of a control period based on the control period setting command input from the industrial machine manufacturer through the engineering tool 3, as described above.

The control processing setting section 12 has a function of setting content (such as a program) of the control processing based on the control processing setting command input from the industrial machine manufacturer through the engineering tool 3.

The control processing performing section 13 has a function of performing the control processing on a control-period basis while the controller 1 is in operation.

The user period processing upper-limit setting section 14 has a function of setting the longest allowable period $TL_{max}$ based on the user period processing upper-limit setting command input from the industrial machine manufacturer through the engineering tool 3.

The user period processing setting section 15 has a function of setting content of the user period processing based on the user period processing setting command input from the user through the operation server 4. The user period processing setting section 15 also puts restrictions on the setting of the content of the user period processing based on the longest allowable period $TL_{max}$, as described above. Specifically, based on the command input through the operation server 4, the user period processing setting section 15 sets the content of the user period processing so that the user period processing is performed at or below the upper limit.

The user period processing performing section 16 has a function of performing the user period processing on a control-period basis while the controller 1 is in operation.

With the above-described configuration, the controller 1 is capable of performing the control processing and the user period processing in each control period while ensuring an optimal design provided by the industrial machine manufacturer and dealing with user needs at the same time.

Advantageous Effects of this Embodiment

As has been described hereinbefore, in the control system 100 according to this embodiment, the controller 1 includes the control processing setting section 12 and the user period processing upper-limit setting section 14. The control processing setting section 12 sets content of the control processing. The user period processing upper-limit setting section 14 sets an upper limit (longest allowable period $TL_{max}$) of the user period processing, which is different from the control processing, which is performed on a control-period basis.

This enables the user to readily add and set a desired user period processing without having to consider control-related restrictions on the part of the industrial machine 2. In other words, even when the user has set a desired user period processing, the industrial machine 2 is faced with no or minimized error attributed to the controller 1.

Also in this embodiment, the control processing setting section 12 sets content of the control processing in response to a control processing setting command input from the engineering tool 3. The user period processing upper-limit setting section 14 sets a longest allowable period $TL_{max}$ in response to a user period processing upper-limit setting command input from the engineering tool 3.

The engineering tool 3 is used by the industrial machine manufacturer to make an adjustment and/or a setting with respect to the industrial machine control system 100. The engineering tool 3 is greatly different in specifications from the operation server 4, which is used by the user to operate the industrial machine control system 100, in that more settings associated with the controller 1 can be made on the engineering tool 3 than on the operation server 4.

Settings associated with the content of the control processing performed within the periodic length ΔT and settings associated with the longest allowable period $TL_{max}$ for performing the user period processing should be made on the part of the industrial machine manufacturer, who has designed the industrial machine 2. Therefore, these settings can be set solely on the engineering tool 3, which can only be used by the industrial machine manufacturer. This ensures normal operation of the industrial machine control system 100, with no or minimized occurrence of error in the controller 1.

Also in this embodiment, the controller 1 further includes the control period setting section 11. The control period setting section 11 sets the periodic length ΔT in response to a control period setting command input from the engineering tool 3. Settings associated with the control period of the controller 1 should be made on the part of the industrial machine manufacturer, who has designed the industrial machine 2. Therefore, these settings can be set solely on the engineering tool 3, which can only be used by the industrial machine manufacturer. This ensures normal operation of the industrial machine control system 100, with no or minimized occurrence of error in the controller 1.

Also in this embodiment, the controller 1 further includes the user period processing setting section 15. In response to a user period processing setting command input from the operation server 4, the user period processing setting section 15 sets the content of the user period processing so that the user period processing is kept within the longest allowable period $TL_{max}$.

Settings associated with the content of the user period processing are desirably made on the part of the user. Therefore, the content of the user period processing is set on the operation server 4, which can be used by the user, instead of on the engineering tool 3, so that the user period processing is performed within the longest allowable period $TL_{max}$. This enables the user to readily add and/or set a period processing while eliminating or minimizing occurrence of error in the controller 1.

Also in this embodiment, the controller 1 further includes the user period processing performing section 16. The user period processing performing section 16 performs the user period processing on the control-period basis. This enables the controller 1 itself to perform the user period processing, which is different from the control processing, within the one periodic length ΔT.

In the above-described embodiment, the CPU (not illustrated) of the controller 1 is a single core, that is, not capable of performing a plurality of processings simultaneously. This configuration, however, is not intended in a limiting sense. The CPU of the controller 1 may be a "multi-core", which includes a plurality of cores. In this case, one of the plurality of cores may be dedicated to the control processing, and another one of the plurality of cores may be dedicated to the user period processing. This ensures that as illustrated in FIG. 7, which can be compared with FIG. 4, two period processings are performed simultaneously in time, at least partially. Even in this case, the longest allowable period $TL_{max}$ for performing the user period processing is restricted based on the periodic length ΔT, which is only accessible by the industrial machine manufacturer (that is, the longest allowable period $TL_{max}$ is equal to or shorter than the periodic length ΔT). Thus, advantageous effects of the above-described embodiment remain obtainable.

As used herein, the term "perpendicular" means substantially or approximately perpendicular within some design tolerance or manufacturing tolerance, as well as precisely perpendicular. As used herein, the term "parallel" means substantially or approximately parallel within some design tolerance or manufacturing tolerance, as well as precisely parallel. As used herein, the term "planar" means substantially or approximately planar within some design tolerance or manufacturing tolerance, as well as precisely planar.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" are intended to mean "substantially or approximately identical", "substantially or approximately same", "substantially or approximately equivalent", and "substantially or approximately different", respectively, within some design tolerance or manufacturing tolerance.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A control apparatus for performing control processing and user period processing within a control period for an industrial machine, comprising:
    processing circuitry configured to
        prior to performing the control processing and the user period processing, set content of the control processing, and set an upper limit of the user period processing, the upper limit corresponding to a longest allowable period in which the user period processing can be performed and the longest allowable period being less than the control period, wherein the user period processing is different from the control processing, and
        in response to receiving a content command input from a first input device communicatively coupled to the control apparatus, set content of the user period processing and, in response to the content of the user period processing being in excess of the longest allowable period, apply restrictions on the content of the user period processing so that the content of the user period processing can be performed at or below the upper limit, wherein
    the processing circuitry is further configured to set the content of the control processing in response to a content command input from a second input device that is different from the first input device, and the processing circuitry is further configured to set the upper limit in response to an upper-limit command input from the second input device that is different from the first input device.

2. The control apparatus according to claim 1, wherein the processing circuitry is further configured to set the control period in response to a control-period command input from the second input device.

3. The control apparatus according to claim 2, wherein the processing circuitry is further configured to perform the user period processing within the control period.

4. A method for controlling an industrial machine in a control system that includes a control apparatus for performing control processing and user period processing within a control period for the industrial machine, comprising:
    setting, prior to performing the control processing, content of the control processing using processing circuitry of the control apparatus;
    setting, prior to performing the user period processing, an upper limit of the user period processing using the processing circuitry of the control apparatus, the upper limit corresponding to a longest allowable period in which the user period processing can be performed and the longest allowable period being less than the control period, and the user period processing being different from the control processing; and
    in response to receiving a content command input from a first input device communicatively coupled to the control apparatus, setting content of the user period processing and, in response to the content of the user period processing being in excess of the longest allowable period, applying restrictions on the content of the user period processing so that the content of the user period processing can be performed at or below the upper limit, wherein
    the setting of the content of the control processing is set in response to a content command input from a second input device that is different from the first input device, and the setting of the upper limit is set in response to an upper-limit command input from the second input device that is different from the first input device.

5. The control apparatus according to claim 1, wherein the processing circuitry is further configured to perform the user period processing within the control period.

6. The control apparatus according to claim 1, wherein the control processing and the user period processing are at least partially performed simultaneously in time, within the control period.

7. The control apparatus according to claim 1, wherein
    the control processing is performed within a control processing performing period and the user period processing is performed within a user period processing performing period, which is less than or equal to the longest allowable period, and
    the control processing performing period and the user period processing performing period are collectively less than the control period.

8. The control apparatus according to claim 1, wherein
    the control processing corresponds to instructing a mechanism to perform a desired motion,
    the user period processing corresponds to data logging processing, and
    the content of the user period processing corresponds to a kind of data obtained during the data logging processing or a number of data obtained during the data logging processing.

9. The control apparatus according to claim 8, wherein the processing circuitry applies restrictions on the content of the user period processing by limiting the kind of data obtained during the data logging processing or the number of data obtained during the data logging processing.

10. The control apparatus according to claim 1, wherein
    the first input device is connected to the processing circuitry and used by a user to operate the control system, and
    the second input device is used by a manufacturer of the industrial machine.

11. A control system, comprising:
    an industrial machine; and
    a control apparatus for performing control processing and user period processing within a control period for the industrial machine,
    wherein the control apparatus includes processing circuitry configured to
        prior to performing the control processing and the user period processing, set content of the control processing, and set an upper limit of the user period processing, the upper limit corresponding to a longest allowable period in which the user period processing can be performed and the longest allowable period being less than the control period, and the user period processing being different from the control processing, and in response to receiving a content command input from a first input device communicatively coupled to the control apparatus, set content of the user period processing and, in response to the content of the user period processing being in excess of the longest allowable period, apply restrictions on the content of the user period processing so that the content of the user period processing can be performed at or below the upper limit, wherein the processing circuitry is further configured to set the content of the control processing in response to a content command input from a second input device that is different from the first input device, and the processing circuitry is further configured to set the upper limit in response to an upper-limit command input from the second input device that is different from the first input device.

12. The control system according to claim 11, wherein the processing circuitry is further configured to set the control period in response to a control-period command input from the second input device.

13. The control apparatus according to claim 12, wherein the processing circuitry is further configured to perform the user period processing within the control period.

14. The control system according to claim 11, wherein the processing circuitry is further configured to perform the user period processing within the control period.

15. The method according to claim 4, further comprising the performing of the user period processing within the control period.

* * * * *